US010970754B2

(12) United States Patent
Malone et al.

(10) Patent No.: US 10,970,754 B2
(45) Date of Patent: Apr. 6, 2021

(54) REAL-TIME SERVICE STATUS

(71) Applicant: NCR Corporation, Duluth, GA (US)

(72) Inventors: David Eric Malone, Cumming, GA (US); Mark David Davies, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 417 days.

(21) Appl. No.: 15/376,578

(22) Filed: Dec. 12, 2016

(65) Prior Publication Data

US 2018/0165721 A1    Jun. 14, 2018

(51) Int. Cl.
| | | |
|---|---|---|
| *G06Q 30/02* | (2012.01) |
| *H04W 4/00* | (2018.01) |
| *H04L 29/08* | (2006.01) |
| *H04W 64/00* | (2009.01) |
| *G06Q 30/00* | (2012.01) |
| *G06Q 10/06* | (2012.01) |
| *H04W 4/60* | (2018.01) |
| *G06Q 10/00* | (2012.01) |
| *H04L 29/06* | (2006.01) |

(52) U.S. Cl.
CPC ......... *G06Q 30/0281* (2013.01); *G06Q 10/00* (2013.01); *G06Q 10/063114* (2013.01); *G06Q 30/016* (2013.01); *H04L 67/02* (2013.01); *H04W 4/60* (2018.02); *H04W 64/006* (2013.01); *H04L 67/42* (2013.01)

(58) Field of Classification Search
CPC ....................................................... G06Q 99/00
See application file for complete search history.

(56) References Cited

U.S. PATENT DOCUMENTS

| | | | | |
|---|---|---|---|---|
| 6,335,927 B1 * | 1/2002 | Elliott | ..................... | H04L 12/14 |
| | | | | 370/352 |
| 6,606,744 B1 * | 8/2003 | Mikurak | ................. | H04L 29/06 |
| | | | | 717/174 |
| 9,123,005 B2 | 9/2015 | Rivere | | |
| 9,740,999 B2 | 8/2017 | Rivere | | |
| 2004/0078721 A1 * | 4/2004 | Williams | ............ | G06F 11/2294 |
| | | | | 714/46 |

(Continued)

FOREIGN PATENT DOCUMENTS

| | | |
|---|---|---|
| CN | 104376448 | 2/2015 |
| CN | 105843900 | 8/2016 |
| WO | 2016/111898 A1 | 7/2016 |

OTHER PUBLICATIONS

R. D. Yates and S. Kaul, "Real-time status updating: Multiple sources," 2012 IEEE International Symposium on Information Theory Proceedings, Cambridge, MA, 2012, pp. 2666-2670, doi: 10.1109/ISIT.2012.6284003. (Year: 2012).*

(Continued)

*Primary Examiner* — Joseph M Waesco
*Assistant Examiner* — Jay-Ming Wang
(74) *Attorney, Agent, or Firm* — Schwegman, Lundberg & Woessner

(57) ABSTRACT

An Application Programming Interface (API) exposes real-time service status information from a service backend system to a mobile application of a mobile device. Interactive, dynamic, and real-time service status information is rendered to the mobile device for managing and/or rating services rendered to a customer who operates the mobile device.

19 Claims, 8 Drawing Sheets

(56) References Cited

U.S. PATENT DOCUMENTS

| | | | |
|---|---|---|---|
| 2007/0245409 A1* | 10/2007 | Harris | H04L 69/10 |
| | | | 726/5 |
| 2012/0089410 A1* | 4/2012 | Mikurak | G06Q 30/0225 |
| | | | 705/1.1 |
| 2013/0008588 A1 | 1/2013 | Tanno et al. | |
| 2013/0090965 A1 | 4/2013 | Rivere | |
| 2014/0222610 A1* | 8/2014 | Mikurak | G06Q 30/0633 |
| | | | 705/26.5 |
| 2015/0310188 A1* | 10/2015 | Ford | H04L 63/0428 |
| | | | 726/28 |
| 2015/0339675 A1* | 11/2015 | Tuchman | G06K 7/1417 |
| | | | 705/7.16 |

OTHER PUBLICATIONS

European Search Report dated Apr. 13, 2018 in copending European Patent Application No. 17205340.7.

* cited by examiner

REAL-TIME SERVICE STATUS

BACKGROUND

Mobile devices are ever present in today's connected world. Individuals now operate these devices to transact with a variety of business over wireless networks. Moreover, mobile devices are used to capture images and videos for moments in a person's life. These devices are heavily integrated into the lives of individuals. Consequently, consumers are comfortable operating these devices and the devices are typically always in the possession of the consumers.

Businesses also provide a variety of services to customers. such as servicing Automated Teller Machines (ATMs) for banks (customers). These service-industry businesses have a variety of technology that allows the business to monitor and manage their customer engineers. However, for a variety of reasons the backend technology for monitoring and managing customer engineers is unavailable to the customers that rely on the customer engineers. As a result, the customers become frustrated and often discouraged with little ability to manage and plan operations that rely on equipment, which is offline and waiting to be serviced by customer engineers.

Typically, customers have Service Level Agreements (SLAs) with their service-industry businesses. Yet, rectifying and spotting less than acceptable service with the SLAs becomes challenging when the necessary metrics for proving a SLA violation often resides in the exclusive control of the service-industry businesses and their backend technology systems. Customers also become experienced and comfortable with specific customer engineers, such that the customers have preferences for particular customer engineers and are reluctant to let different personnel service the customer's equipment. But, desired customer engineers can be off of work (planned or unplanned), leave the employ of the service-industry business, or busy servicing other customers, such that it becomes impractical for the service-industry business to always and consistently provide a same customer engineer to a particular customer. Customers have no way of knowing how good new or different customer engineers are and will often wait until their desired customer engineers become available. These situations become problematic for both the customers and the service-industry businesses.

SUMMARY

In various embodiments, methods and a system for real-time service status processing are presented.

According to an embodiment, a method for real-time service status processing is provided. Specifically, and in one embodiment, a service status for a service call is dynamically requested in real time through an Application Programming Interface (API) to a service backend system. Next, service status information is rendered within a screen presented on a display of a mobile device; the service status information is provided in real time through the API from the service backend system in response to a request for the service status on the service call.

DETAILED DESCRIPTION

Figure 1A:
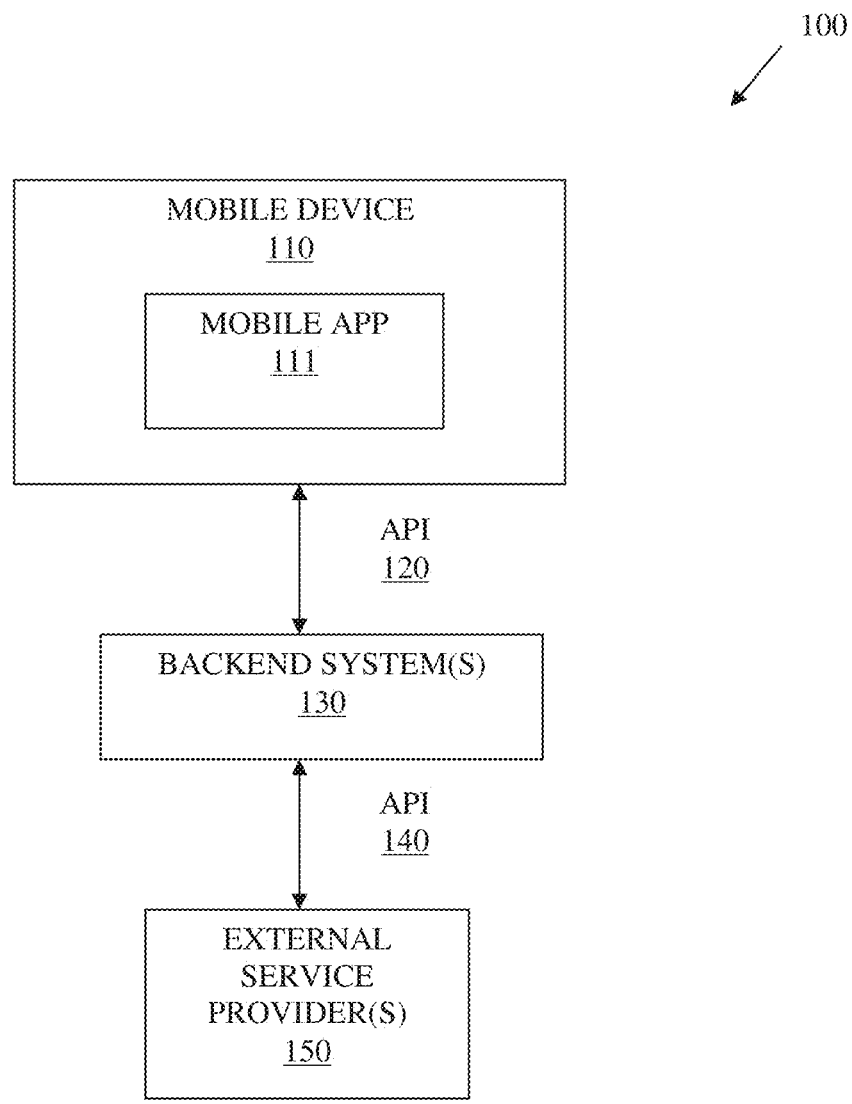
FIG. 1A is a diagram of a system for real-time service status processing, according to an example embodiment.

FIG. 1A is a diagram of a system 100 for real-time service status processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the real-time service status processing embodiments presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for real-time service status processing can be implemented in all, or some combination of the components shown in different hardware computing devices having one or more hardware processors.

The system 100 includes: a mobile device 110, a first Application Programming Interface (API) 120, one or more backend system(s) 130, a second API 140, and one or more external service providers 150.

The mobile device 110 includes a mobile application (app) 111. The mobile application 111 is provided to customers by a service-industry business. The mobile application 111 is configured to interact and provide real-time service status information relevant to the customer's equipment and the customer engineers that service the customer's equipment.

This is achieved through the mobile application 111 configured to access real-time incident and maintenance service data known to the service-industry business. The mobile application 111 processes API 120 to access a backend system 130 managed by the service industry business. The service industry business determines the level of exposure to provide the customer and configures the backend system 130 for permitting such access through the API 120. The service-industry business may also contract out some of its customer engineer work to third-parties, these third-party organizations have their own external service provider 150 systems, which are also linked to the service-industry business through API 140.

The mobile application 111 provides visibility, transparency, and real-time interaction with the service-industry's service and maintenance information for a customer that operates mobile device 110 and interacts with mobile application 111. The API 120 provides the processing mechanism for accessing exposed features of the backend system 130 of the service-industry, and the API 140 provides the processing mechanism for integrating third-party service providers 150 and their real-time actions into the backend system 130.

The exposed features of the backend system 130 for the service industry provides real-time service status details and can include a variety of exposed information, such as but not limited to: an estimated time of arrival (ETA) for a customer engineer (CE) to fix a problem with a piece of customer equipment, identification of a specific CE assigned to fix a problem (such as a full name and/or employee number for the CE), a picture image of the assigned CE, contact information for an assigned CE (phone number, email address, etc.), an average customer-provided rating for a given CE, a real-time physical location of a CE assigned to address a problem provided on a map with a dynamic update as the CE's location changes, a status tracker showing how a current service call tracks in relation to a SLA for service calls, aggregate or summary views for customer service calls at a defined level of granularity (store, city, zip code, state, region, country, collection of countries, etc.), and the like.

In an embodiment, the mobile app is an existing mobile app that is enhanced with the API 120 providing real-time access to the backend system 130. That is, an existing mobile app utilized by a customer for a given service industry is enhanced as mobile app 111. This ensures that a mobile app that the customer is already familiar with using and does use can be enhanced providing the enhanced real-time service status information as discussed above. In this way, the customer does not have to utilize and learn an entirely new mobile application to realize the benefits of the teachings presented herein.

In an embodiment, the mobile device 110 is one of: a tablet, a phone, a wearable processing device. and an intelligent appliance (an appliance having processor, memory, and storage capabilities).

In an embodiment, the customer is a business, such as and by way of example only: a bank, a hotel, a restaurant, a grocer, a retailer, etc.

In an embodiment, the service industry is a business that services equipment of the customer, and the equipment includes, such as and by way of example only: an Automated Teller Machine (ATM), a Self-Service Terminal (SST), and/or a Point-Of-Sale (POS) terminal. The service itself can include anything that requires attention, such as and by way of example only: replenishment of media, software upgrades, software patches, electromechanical device attention and/or replacement, peripheral attention and/or replacement, and the like.

In an embodiment, the API 120 is an open API meaning that access to features of the backend system 130 is defined in a published and known format and syntax, which permits extension in a manner that does not necessitate changes to the mobile app 111. For example, the API 120 can define how component data returned from the backend system 130 is displayed in the user-facing interface of the mobile app 111, such that when a different type of data is available from the backend system, the API 120 permits the mobile app 111 to process the different type of data (never processed before by the mobile app 111) in a manner that the mobile app 111 can process and display.

In an embodiment, the API 140 is also an open API permitting the third-party service providers 150 to provide new types of information in a manner that the backend system 130 can process and vice versa.

The mobile app 111 permits dynamic user interface through a user-facing interface that is presented or rendered on a display of the mobile device 110 in screens. The API 120 permits real-time interaction between the software instructions of the mobile app 111 and software instructions of the backend system 130. Similarly, the software instructions of the backend system 130 permits real-time interaction between the software instructions of the third-party service providers 150 through the API 140. In an embodiment, the third-party service providers 140 utilize a customized mobile app on mobile devices of the third-party service providers 140 processing the API 140 for real-time interaction.

Some example screen shots of rendered real-time information provided through the API 120 to the display of a customer's mobile device 110 are now presented for purposes of illustration in the FIGS. 1B-1E. It is noted that these screen shots represent just a sample of processing that is achievable with the teachings presented herein and these screen shots are not intended to be exclusive so as to preclude other screen shots of rendered real-time information through the API 120 interfaced with a service-industry's backend system 130.

FIGS. 1B-1E are images of mobile interfaces for real-time service status processing, according to an example embodiment.

Figure 1B:
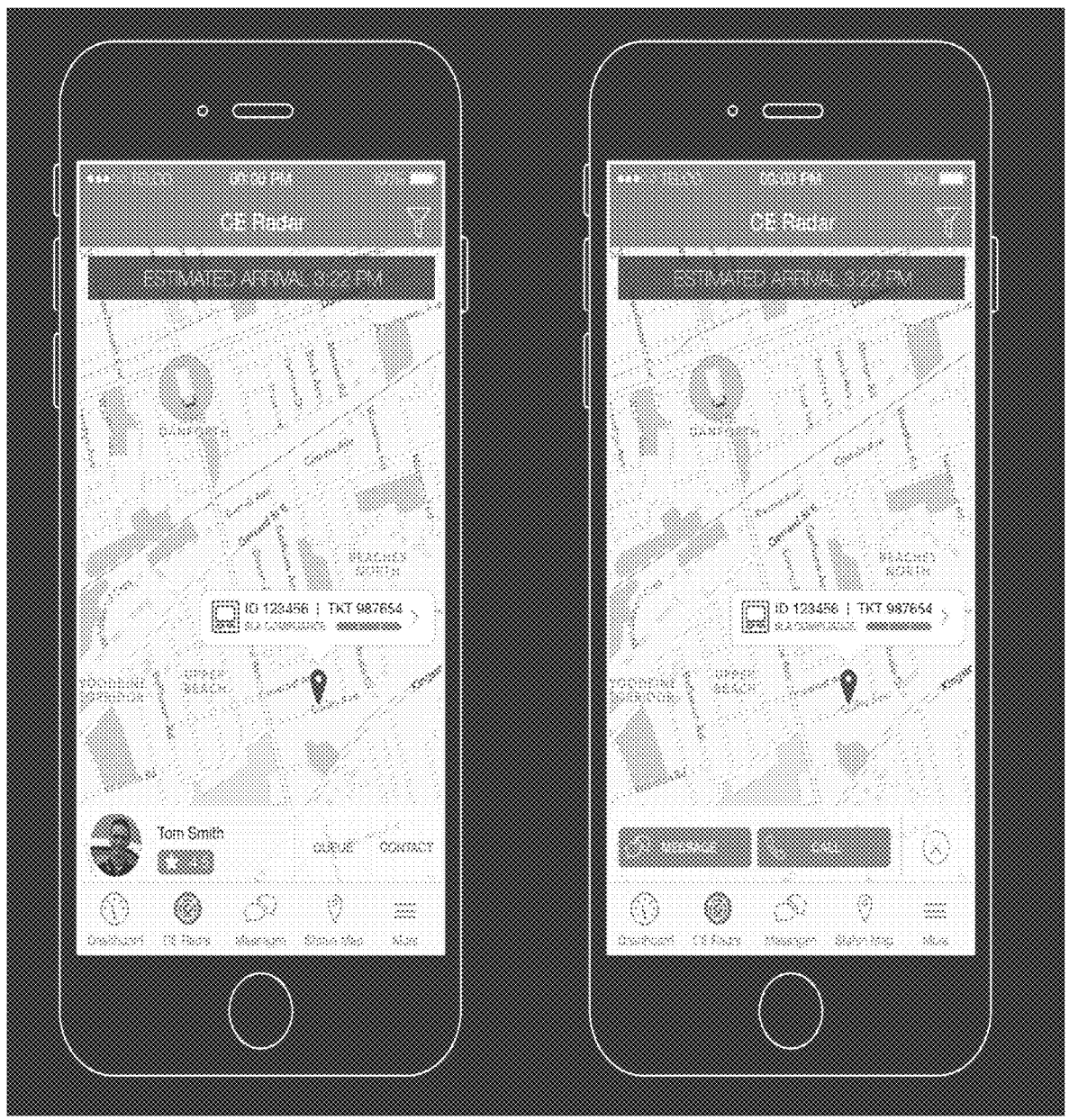
FIGS. 1B-1E are images of mobile interfaces for real-time service status processing, according to an example embodiment.

The FIG. 1B illustrates two sample screen shots that are produced by processing the mobile application 111 with API 120 interacting in real time with a backend system 130 of a service industry. The two example screen shots illustrate home and contact information options provided through the user-facing interface of the mobile application 111.

The screen shots demonstrate a map (location) centric views that provide real-time location status information to a customer operating the mobile device 110 with respect to a CE and an ATM that is to be serviced by the CE on behalf of the customer. The top of each screen shot provides an estimated time of arrival of 3:22 PM for the CE to arrive at the ATM. A popup screen within the screen provides an ATM equipment identifier (ID) of 123456 along with a service ticket number of 987654.

Within the popup screen a graphical SLA compliance image is provided as three small rectangles having a first of the three rectangles shaded darker than the two rectangles to the right of the darkened rectangle. This provides a compliance indicator that the CE is currently adhering to with respect to SLA requirements that the service industry has with the customer for servicing ATMs.

The first screen shot (leftmost screen shot in the FIG. 1B) also includes a name for the CE (Tom Smith) along with a picture image of Tom Smith. Underneath the picture image is a graphic indication of an average customer-provided rating for Torn Smith, which is starred as being an average rating of 4.5 out of 5 stars. To the right of the picture image for Tom Smith is selectable options (which the customer can interactive activate by selecting the options within the rendered screen).

The first option is identified as Queue, which is a current work queue assigned to Tom Smith (this permits the customer to identify how busy Tom is at present). To the right of the Queue option is a Contact option. The second screen shot (the rightmost screen shot in the FIG. 1B) is a modified version of the first screen shot after the customer has selected the Contact option. The second screen shot then provides two options at the bottom for the customer to interactively and in real time message Tom or call Tom.

Each screen shot also provides additional features that the customer can select to activate, such as a dashboard view, a CE radar view (which is the selected view in the two screen shots presented in the FIG. 1B), a message option to message Tom, a status map, and more options. Additionally, the popup view includes a rightmost arrow that if selected provides more detailed information with respect to the equipment (ATM) that is to be serviced and the ticket itself.

Figure 1C:

The FIG. 1C also includes two screenshots. The leftmost screen shot shows a view when the customer selected the work Queue option from the leftmost screenshot of the FIG. 1B. This work queue view shows that Tom is now in route to service the ATM and is 1.1 km from the ATM and provides the address to the ATM along with the ATM identifier, ticket number, an indication that Tom was dispatched through an automatic ATM generated event and is expected to arrive 2 hours and 10 minutes before required to do so according to the SLA.

The second screen shot of the FIG. 1C (rightmost screenshot) shows what is rendered by the mobile application 111 once Tom has completed servicing the ATM. The status is identified as being closed at 4:15 PM and 1:38 minutes ahead of what is required by the SLA. A picture image of Tom is presented again and the customer is asked to rate Tom's completed service of the ATM on a scale of 1 to 5 stars and how likely the customer is to recommend Tom for service requests to a colleague on a scale of 0 to 10. The customers rating and likely recommendation of Tom is provided when the customer activates the Submit button presented at the bottom of the leftmost screen. Should the customer provide a rating or recommendation of Tom that falls below a preconfigured threshold, then additional screens can be generated requesting that the customer provide more specific details as to what was unsatisfactory about Tom's service of the ATM.

Figure 1D:

The FIG. 1D provides generated screen shots (3) for the mobile application 111 for an Apple® Watch® (a type of wearable processing device). Because wearables lack display area that other mobile devices have, the way information is rendered is changeable to reflect the lack of display area on a mobile device 110 that is a wearable. The leftmost screen shot shows a typical home screen for the mobile device 110 (when the mobile device 110 is an Apple® Watch®) with the mobile application 111 having its own unique icon image displayed within the screen shot. The middle screen shot shows the screen presented when the customer selects the unique icon from the home screen to activate the mobile application 111. The rightmost screen shot shows the screen presented when the customer selects the CE radar option from the middle screen. The rightmost screen shot also provides the ETA for the CE and a contact CE option.

Figure 1E:

The FIG. 1E provides generated screen shots (2) for mobile application 111 when the mobile device 110 is again an Apple® Watch®. The leftmost screenshot shows the additional options for the CE's work queue and service ticket details that are presented when the customer selected the more option of scrolled down from the middle screen shot of the FIG. 1D (since the watch lacks display space to provide all the options in a user-friendly manner on a single screen shot for the display face of the watch). The rightmost screen shot shows an alert that is automatically raised and presented as a screen when Tom is within a predefined amount of time of arriving for servicing the ATM. The predefined amount of time is a configurable option within the mobile application 111, which the customer can configure for the mobile application 111. The mobile application 111 may also coordinate with a second version of the mobile application 111 that processes on the customer's other mobile devices, such as a phone or a tablet. This permits smart synchronized coordination between the wearable watch and the customer's phone or tablet.

Again, the FIGS. 1B-1E are presented as illustration of some interactive and real-time service status information provided by the system 100. These and other embodiments are now discussed with reference to the FIGS. 2-4.

Figure 2:
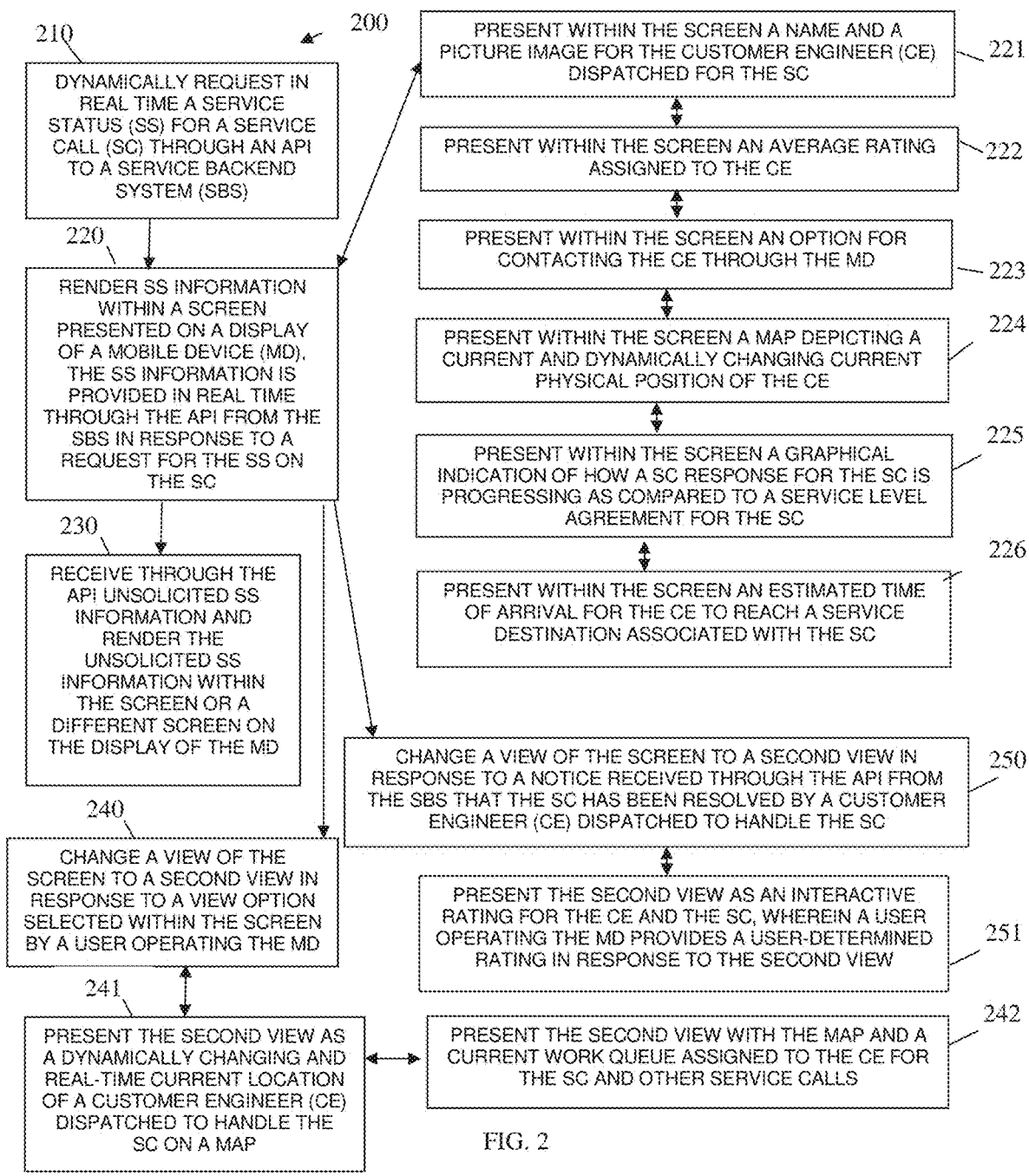
FIG. 2 is a diagram of a method for real-time service status processing, according to an example embodiment.

FIG. 2 is a diagram of a method 200 for real-time service status processing, according to an example embodiment. The software module(s) that implements the method 200 is referred to as a "service status agent." The service status agent is implemented as executable instructions programmed and residing within memory and/or a non-transitory computer-readable (processor-readable) storage medium and executed by one or more hardware processors of a hardware computing device. The processors of the device that executes the image service status agent are specifically configured and programmed to process the image capture manager. The service status agent has access to one or more networks during its processing. The networks can be wired, wireless, or a combination of wired and wireless.

In an embodiment, the device that executes the service status agent is the mobile device 110. In an embodiment, the mobile device 110 is one of: a tablet, a phone, a wearable processing device, a laptop, and an intelligent appliance.

In an embodiment, the service status agent is the mobile application 111.

At 210, the service status agent dynamically requests in real time a service status for a service call through an API to a service backend system. In an embodiment, the service backend system is the service backend system 140.

At 220, the service status agent renders service status information within a screen presented on a display of a mobile device. The service status information is provided in real time through the API from the service backend system in response to a request for the service status on the service call.

According to an embodiment, at 221, the service status agent presents within the screen a name/identifier and a picture image for the customer engineer dispatched for the service call. The image allows the user to verify the individual showing up for a service call on equipment associated with the user is who the individual is supposed to be.

In an embodiment of 221 and at 222, the service status agent presents within the screen an average rating assigned to the customer engineer.

In an embodiment of 222 and at 223, the service status agent presents within the screen an option for contacting the customer engineer through the mobile devices, such as a device call or a short message service (SMS) text message.

In an embodiment of 223 and at 224, the service status agent presents within the screen a map depicting a current and dynamically changing current physical position of the customer engineer.

In an embodiment of 224 and at 225, the service status agent presents within the screen a graphical indication of how a service call response for the service call is progressing as compared to a service level agreement for the service call.

In an embodiment of 225 and at 226, the service status agent presents within the screen an estimated time of arrival for the customer engineer to reach a service destination associated with the service call.

According to an embodiment, at 230, the service status agent receives through the API unsolicited service status information and the service status agent renders the unsolicited service status information within the screen or a different screen on the display of the mobile device. The unsolicited information being information pushed from the service backend system.

In an embodiment, at 240, the service status agent changes a view of the screen to a second view in response to a view option selected within the screen by a user operating the mobile device. A variety of view options are provided a sampling of which were discussed above with the FIGS. 1B-1E.

According to an embodiment of 240 and at 241, the service status agent presents the second view as a dynamically changing and real-time current location for a customer engineer dispatched to handle the service call on a map. This was described and presented above with the FIGS. 1A-1E.

In an embodiment of 241 and at 242, the service status agent presents the second view with the map and a current work queue assigned to the customer engineer for the service call and other service calls that may be assigned to the customer engineer. This was shown in the leftmost screen shot of the FIG. 1C.

In an embodiment, at 250, the service status agent changes a view of the screen to a second view in response to a notice received through the API from the service backend system that the service call has been resolved by a customer engineer dispatched to handle the service call. This was shown in the rightmost view of the FIG. 1C.

In an embodiment of 250 and at 251, the service status agent presents the second view as an interactive rating for the customer engineer and the service call. A user operating the mobile device provides a user-determined rating in response to the second view.

Figure 3:
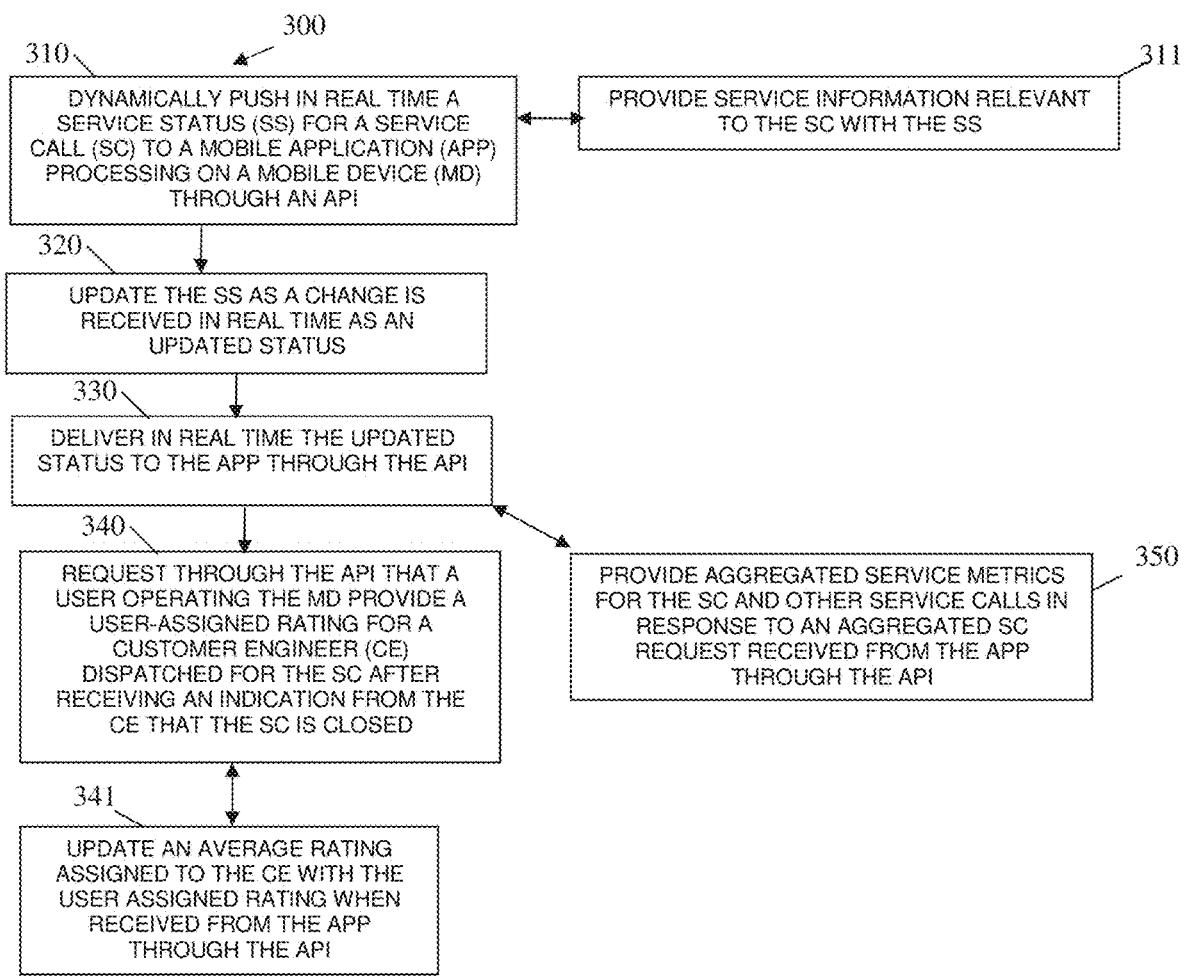
FIG. 3 is a diagram of another method for real-time service status processing, according to an example embodiment.

FIG. 3 is a diagram of another method for real-time service status processing, according to an example embodiment. The software module(s) that implements the method 300 is referred to as a "service manager." The network service is implemented as executable instructions programmed and residing within memory and/or a non-transitory computer-readable (processor-readable) storage medium and executed by one or more hardware processors of a hardware device. The processors of the device that executes the service manager are specifically configured and programmed to process the service manager. The service manager has access to one or more networks during its processing. The networks can be wired, wireless, or a combination of wired and wireless.

In an embodiment, the device that executes the service manager is a server.

In an embodiment, the device that executes the service manager is a cloud (a collection of logical servers that can be geographically dispersed from one another).

In an embodiment, the service manager is the backend system 130.

The service manager utilizes API 120 to dynamically interact with the mobile application 111 and/or the method 200 of the FIG. 2.

At 310, the service manager dynamically pushes in real time a service status for a service call to a mobile application through an API.

In an embodiment, at 311, the service manager provides service information relevant to the service call with the service status. The service information can be any of those identified above as backend system exposed information discussed with the FIG. 1A.

At 320, the service manager updates the service status as a change is received in real time as an updated status. That is, interaction with a customer engineer or a third-party service provider or any automated notice from the equipment that is the subject of the service call can change the service status and the service manager receives and notes the change as an updated status.

At 330, the service manager delivers in real time the updated status to the mobile application (such as mobile application 111) through the API. So, as changes are received to the service status those changes are updated and communicated in real time to the mobile application.

In an embodiment, at 340, the service manager requests through the API that a user operating the mobile device provide a user-assigned rating for a customer engineer dispatched for the service call. This processing occurs after the service manager receives an indication from the customer engineer or the equipment being service (automated notification) that the service call has been closed.

In an embodiment of 340 and at 341, the service manager updates an average rating assigned to the customer engineer with the user-assigned rating when received from the mobile application through the API. That is, a current average rating assigned to the customer engineer is recalculated with the user-assigned rating to produce an updated average rating associated with the customer engineer.

According to an embodiment, at 350, the service manager provides aggregated service metrics for the service call and other service calls in response to an aggregated service call request received from the mobile application through the API. Here, the level of detail can be driven by the options selected in the mobile application. This was discussed above with reference to the FIG. 1A.

Figure 4:
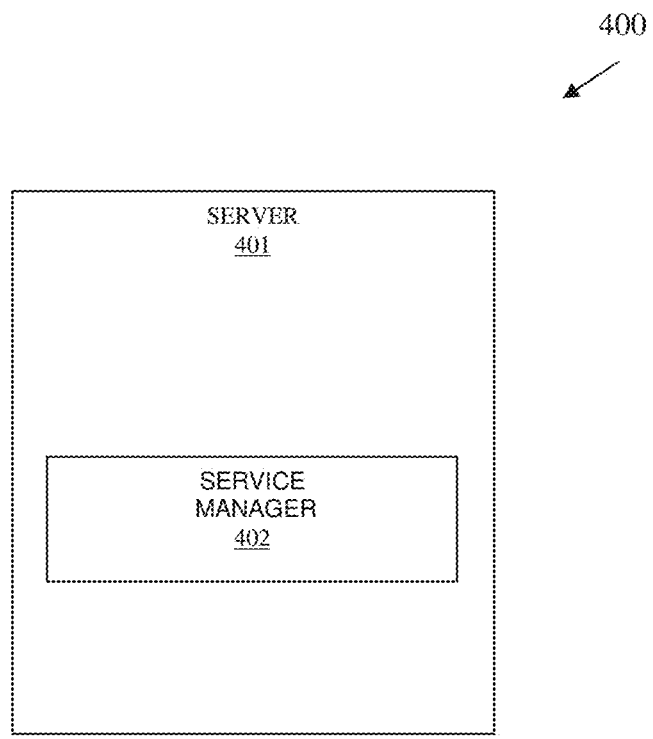
FIG. 4 is a diagram of another system for real-time service status processing, according to an example embodiment.

FIG. 4 is a diagram of another system 400 for real-time service status processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1E and 2-3.

The system 400 includes a server 401 and the server including a network service manager 402.

The service manager 402 is configured to: 1) execute on at least one hardware processor of the server 401; 2) dynamically and in real time provide a service status for a service call to a mobile application processing on a mobile device through an API, 3) provide in real time service information relevant to the service call through the API to the mobile application, and 4) deliver in real time any updates occurring with the service call to the mobile application through the API.

In an embodiment, the service manager 402 is further configured to: 6) integrate third-party information relevant to the service call and provide the third-party information in real time to the mobile application through the API. In an embodiment, the third-party information originates from a third-party operated device 150 and is communicated to the service manager 402 through API 140 and the service manager 402 provides the third-party information to the mobile application 111 through API 120.

In an embodiment, the network service manager 402 is the backend system 130.

In an embodiment, the network service manager 402 is the method 300.

In an embodiment, the mobile application is the mobile application 111.

In an embodiment, the mobile application is the method 200.

In an embodiment, the network service manager 402 is all or some combination of the processing discussed with the FIGS. 1A-1E and the method 300.

In an embodiment, the mobile application is all or some combination of the processing discussed with the FIGS. 1A-1E and the method 200.

In an embodiment, the server 401 is part of or configured within a cloud processing environment.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
dynamically requesting in real time, by executable instructions that execute on a hardware processor of a mobile device from a non-transitory computer-readable storage medium, a service status for a service call through an Application Programming Interface (API) to a service backend system;
rendering, by the executable instructions, service status information within a screen presented on a display of the mobile device, wherein the service status information is provided in real time through the API from the service backend system in response to a request for the service status on the service call, wherein rendering further includes rendering within the screen: a name of a responding engineer to the service call, a current location of the responding engineer superimposed on a map, an equipment identifier assigned to a piece of equipment that is to be serviced with the service call, a ticket number that is assigned to the service call, a first button to message the responding engineer from the screen, and a second button to message the responding engineer from the screen, wherein rendering further includes obtaining component data definitions for the service status information from the API that describes how components of the service status information is rendered within the screen on the display of the mobile device, wherein rendering further includes rendering the equipment identifier and the ticket number within a popup window along with a selectable arrow option that when activated presents detailed information for the piece of equipment and along with a compliance indicator providing a graphic presentation as to whether the responding engineer is adhering to service-level agreement requirements, and rendering the popup window above the current location of the responding engineer on the superimposed map;
presenting, by the executable instructions, one or more summary views associated with the service call and other service calls at a defined-level of granularity provided through a user operating the mobile device, wherein the one or more summary views obtained through the API from the service backend system; and
raising, by the executable instructions, an alert that is automatically raised and presented on the display of the mobile device when the responding engineer is determined to be within a predetermined amount of time from arriving at an equipment location where the piece of equipment is located.

2. The method of claim 1 further comprising receiving, by the executable instructions, through the API unsolicited service status information and rendering the unsolicited service status information within the screen or a different screen on the display of the mobile device.

3. The method of claim 1 further comprising, changing, by the executable instructions, a view of the screen to a second view in response to a view option selected within the screen by the user operating the mobile device.

4. The method of claim 3, wherein changing further includes presenting the second view as a dynamically changing and real-time current location of the responding engineer dispatched to handle the service call on the map.

5. The method of claim 4, wherein changing further includes presenting the second view with the map and a current work queue assigned to the responding engineer for the service call and the other service calls.

6. The method of claim 1 further comprising, changing, by the executable instructions, a view of the screen to a second view in response to a notice received through the API from the service backend system that the service call has been resolved by the responding engineer dispatched to handle the service call.

7. The method of claim 6, wherein changing further includes presenting the second view as an interactive rating for the responding engineer and the service call, wherein the user operating the mobile device provides a user-determined rating in response to the second view.

8. The method of claim 1, wherein rendering further includes presenting within the screen the name and a picture image for the responding engineer dispatched for the service call.

9. The method of claim 8, wherein presenting further includes presenting within the screen an average rating assigned to the responding engineer.

10. The method of claim 1, wherein presenting further includes presenting within the screen the map depicting the current location and dynamically changing current physical position of the responding engineer.

11. The method of claim 10, wherein presenting further includes presenting within the screen a graphical indication of how a service call response for the service call is progressing as compared to a service level agreement for the service call.

12. The method of claim 11, wherein presenting further includes presenting within the screen an estimated time of arrival for the responding engineer to reach a service destination associated with the service call.

13. A method, comprising:
dynamically pushing in real time, by executable instructions that execute on a hardware processor of a server from a non-transitory computer-readable storage medium, a service status for a service call to a mobile application processing on a mobile device through an Application Programming Interface (API) and providing component data definitions for the service status through the API that describes how components of the service status is rendered on a mobile device display of the mobile device by the mobile application;
updating, by the executable instructions, the service status as a change is received in real time as an updated status;
delivering in real time, by the executable instructions, the updated status to the mobile application through the API, wherein delivering further includes providing the updated status to an interface associated with the mobile application and including with the updated status: a name of a responding engineer to the service call, a current location of the responding engineer superimposed on a map, an equipment identifier assigned to a piece of equipment that is to be serviced with the service call, a ticket number that is assigned to the service call, a first option to message the responding engineer from the interface, and a second option to message the responding engineer from the interface, wherein delivering further includes delivering the equipment identifier and the ticket number within a popup window along with a selectable arrow option that when activated presents detailed information for the piece of equipment and along with a compliance indicator providing a graphic presentation as to whether the responding engineer is adhering to service-level agreement requirements, and delivering the popup window above the current location of the responding engineer on the superimposed map;
providing, by the executable instructions, summary views associated with the service call and other service calls at a defined-level of granularity provided through a mobile request issued through the mobile application; and
sending, by the executable instructions, an alert through the API that is automatically provided to the mobile application for presenting on the mobile device display of the mobile device when the responding engineer is determined to be within a predetermined amount of time from arriving at an equipment location where the piece of equipment is located.

14. The method of claim 13 further comprising, requesting, by the executable instructions, through the API that a user operating the mobile device provide a user-assigned rating for the responding engineer dispatched for the service call after receiving an indication from the responding engineer that the service call is closed.

15. The method of claim 14, wherein requesting further includes updating an average rating assigned to the responding engineer with the user assigned rating when received from the mobile application through the API.

16. The method of claim 13 further comprising, providing aggregated service metrics for the service call and the other service calls in response to an aggregated service call request received from the mobile application through the API.

17. The method of claim 13, wherein dynamically pushing further includes providing service information relevant to the service call with the service status.

18. A system, comprising:
a server including a hardware processor and a non-transitory computer-readable storage medium;
the hardware processor;
the non-transitory computer-readable storage medium including executable instructions representing a service manager; and
the service manager when executed by the hardware processor from the non-transitory computer-readable storage medium causes the processor to:
dynamically and in real time provide a service status for a service call to a mobile application processing on a mobile device through an Application Programming Interface (API) and provide component data definitions for the service status through the API that describes how components of the service status is rendered on a mobile device display of the mobile device by the mobile application;
provide in real time service information relevant to the service call through the API to the mobile application;
deliver in real time any updates occurring with the service call to the mobile application through the API;
deliver the updates to an interface of the mobile application with the updates including:
a name of a responding engineer to the service call, a current location of the responding engineer superimposed on a map, an equipment identifier assigned to a piece of equipment that is to be serviced with the service call, a ticket number that is assigned to the service call, a first option to message the responding engineer from the interface, and a second option to message the responding engineer from the interface, wherein the equipment identifier and the ticket number is provided within a popup window along with a selectable arrow option that when activated presents detailed information for the piece of equipment and along with a compliance indicator providing a graphic presentation as to whether the responding engineer is adhering to service-level agreement requirements, and the popup window is provided above the current location of the responding engineer on the superimposed map;
deliver one or more summary views to the interface of the mobile application associated with the service call and other service calls at a defined-level of granularity provided through the interface of the mobile application; and
provide an alert through the API that is automatically provided to the mobile application for presenting on the mobile device display of the mobile device when the responding engineer is determined to be within a predetermined amount of time from arriving at an equipment location where the piece of equipment is located.

19. The system of claim 18, wherein the service manager when executed by the hardware processor from the non-transitory computer-readable storage medium further causes the processor to:

integrate third-party information relevant to the service call and provide the third-party information in real time to the mobile application through the API.

\* \* \* \* \*